United States Patent [19]

Higashionji et al.

[11] Patent Number: 4,755,898
[45] Date of Patent: Jul. 5, 1988

[54] AMORPHOUS MAGNETIC HEAD

[75] Inventors: Masaru Higashionji; Akio Kuroe, both of Katano; Eisuke Sawai, Hirakata; Mitsuo Satomi, Katano; Hiroshi Sakakima, Hirakata; Kenji Kondo, Osaka, all of Japan

[73] Assignee: Matsushita Electric Industrial Co., Ltd., Kadoma, Japan

[21] Appl. No.: 619,959

[22] Filed: Jun. 12, 1984

[30] Foreign Application Priority Data

Jun. 13, 1983 [JP] Japan .................................. 58-105192
Oct. 12, 1983 [JP] Japan .................................. 58-189196

[51] Int. Cl.$^4$ ........................ G11B 5/235; G11B 5/127
[52] U.S. Cl. ..................................... 360/120; 360/122; 360/125
[58] Field of Search ................ 360/119, 120, 122, 125, 360/126, 127

[56] References Cited

U.S. PATENT DOCUMENTS

| | | | |
|---|---|---|---|
| 3,795,954 | 3/1974 | Alex et al. | 360/120 X |
| 3,807,043 | 4/1974 | Hikino et al. | 360/119 |
| 4,048,714 | 9/1977 | Huntt | 360/120 |
| 4,152,741 | 5/1979 | Mizuno et al. | 360/119 |
| 4,182,643 | 1/1980 | Calderon, Jr. et al. | 360/119 |
| 4,361,860 | 11/1982 | Nozawa | 360/120 |
| 4,411,716 | 10/1983 | Shiiki et al. | 360/125 X |
| 4,488,195 | 12/1984 | Yanagiuchi et al. | 360/125 |
| 4,531,170 | 7/1985 | Takei et al. | 360/119 |
| 4,578,728 | 3/1986 | Skakima et al. | 360/125 |
| 4,595,964 | 6/1986 | Kimura et al. | 360/119 X |
| 4,602,307 | 7/1986 | Toriu et al. | 360/119 X |
| 4,639,810 | 1/1987 | Sakai | 360/122 X |

FOREIGN PATENT DOCUMENTS

| | | | |
|---|---|---|---|
| 0042016 | 4/1978 | Japan | 360/119 |
| 0051016 | 5/1981 | Japan | 360/120 |
| 0077914 | 6/1981 | Japan | 360/120 |
| 0078613 | 5/1982 | Japan | 360/122 |
| 0111816 | 7/1982 | Japan | 360/122 |
| 0179926 | 11/1982 | Japan | 360/125 |
| 0012120 | 1/1983 | Japan | 360/126 |

Primary Examiner—John H. Wolff
Assistant Examiner—Andrew L. Sniezek
Attorney, Agent, or Firm—Cushman, Darby & Cushman

[57] ABSTRACT

A pair of half core pieces is bonded by a high lead glass bond having a low melting point, which is formed on a metal layer of small wetting angle, such as Cr, Cu, Ag, Ti, the metal layer being formed by spattering at least on a part adjacent to a plane of gap of each core piece.

4 Claims, 4 Drawing Sheets

AMORPHOUS MAGNETIC HEAD

BACKGROUND OF THE INVENTION

1. Field of the Invention

The present invention relates generally to a magnetic head using an amorphous ferromagnetic alloy for a core.

2. Description of the Prior Art

A typical conventional magnetic head uses an alloy such as permalloy, Sendust (trademark) or Alperm (trademark) and ferrite for a core. At present, ferrite is the best of these materials in abrasion-resistance, but ferrite has a lower saturation flux density, BS, by 30–50% than the above-mentioned alloy material. In case that the ferrite magnetic head is applied to recording with a high density magnetic recording medium which has appeared recently and has a high coercive force, the magnetic saturation of the core material is a problem, and its performance is not so good compared with the material of the alloy. On the other hand, the alloy material is not satisfactory in abrasion-resistance in comparison with ferrite, but it is superior in saturation flux density, BS.

An amorphous ferromagnetic alloy which is superior in magnetic characteristic has appeared. However, since it is difficult to make thick material of the amorphous alloy, in order to assemble the core of the magnetic head, the core keeps its mechanical strength by being pinched with a pair of non-magnetic clamping plates on both sides thereof. The technical art of bonding of these materials has become extremely important.

Usually, glass-bonding is used for the ferrite magnetic head, and for the alloy material, a brazing with silver or the like material is adopted, wherein the working temperature is usually over 700° C. As for the amorphous alloy, the working temperature usually must be lower than 500° C. when considering the magnetic characteristic—a crystalization temperature (hereinafter is referred as TX). When the amorphous ferromagnetic alloy is heated over the crystallization temperature, TX, it crystallizes and becomes brittle, and furthermore the magnetic characteristic is deteriorated, and such an amorphous ferromagnetic alloy becomes not usable as the magnetic material. Therefore, in case that the amorphous material is used, bonding of component members of the head core or forming the magnetic gap should be made preferably by bonding the magnetic material with a known epoxy resin or a soldering material. Since the working temperature of these bonding materials is under 300° C., at most, these bonding methods are safe, being free from the crystallization, but there is a shortcoming that the bonding strength is low.

The width of a track in an audio head is comparatively wide and a magnetic gap is wide, too, and therefore, there is no problem of the bonding strength. However, concerning the heads for a video-tape recorder, a computer and a data recorder, their width of a track is very narrow (for example, several tens $\mu$m), and the magnetic gap is very narrow too (for example, under 0.3 $\mu$m). Accordingly, the present situation is that it is difficult to keep a precise width of the magnetic gap when using bonding or soldering material.

Therefore, as a method to precisely keep the magnetic gap, bonding by glass is the most reliable. However, in case that the magnetic head is composed by using amorphous ferromagnetic metal, the process of bonding and forming of magnetic gap preferably should be carried out under the temperature of 500° C., and a low melting point glass material having a melting point under 500° C. is needed for this process.

A typical conventional low melting point high lead glass has a softening point of 350° C. in view of the bonding strength. This softening point of 350° C. is the lower limit. In order to obtain sufficiently low viscosity for bonding, these bonding glasses must be treated over the temperature of 550° C. However, the amorphous material crystallizes and loses the characteristic of magnetic material even under above-mentioned temperature, and thus the bonding by glass has not been usable. In other words, in case that the core is made from a material of poor heat-resistance such as an amorphous material, there has been a problem that a rigidly bonded magnetic gap could not be formed.

SUMMARY OF THE INVENTION

It is an object of the invention to provide a magnetic head which has a structure bonded by glass at a lower temperature compared with the usual bonding temperature of a low melting point glass.

A magnetic head in accordance with the present invention comprises:

two core pieces of amorphous ferromagnetic material, a metal layer formed on an inside part of at least one core piece, the inside part being contiguous to a plane of gap of the core piece, at least a gap spacer inserted in the gap, and a region of bonding glass formed at least on the metal layer.

DESCRIPTION OF THE PREFERRED EMBODIMENT

Figure 1:
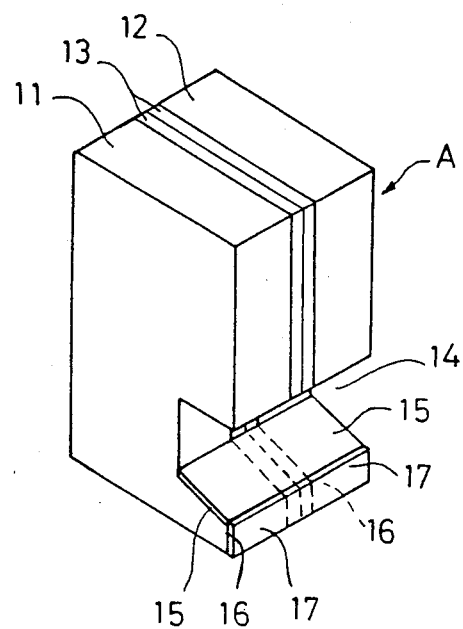
FIG. 1 is a perspective view of a half core block of a magnetic head of a first embodiment.

An amorphous alloy material, for example, $Co_{81}$-$Nb_{15}$-$Zr_4$ is used as a source for forming a core of the magnetic head in the invention. This amorphous alloy material is, for example, spattered on a thoroughly cleaned substrate of glass-ceramics, high melting point glass, ceramic or ferrite, to form component pieces of a core of magnetic head. Then, on the part adjacent to a face to become the gap of a magnetic head, a layer of metal, onto which a low melting point glass has a good melting characteristic, is formed. Cr, Cu, Ag, Ti and Al are suitable as the material of the metal layer, and the metal layer is formed by depositing or spattering. Then, a layer of low melting point glass, for instance, that including lead is used to bond a pair of the component pieces. Though the low melting point glass has a poor wetting property in its high viscosity state, the art according to the present invention can provide a satisfactory bonding with glass despite being in a state of comparatively high viscosity. As a result, glass bonding can be processed at the low working temperature.

Preferable part(s) on which the metal layer is (are) to be formed in (are), for example, a face contiguous to each magnetic gap face, both inside walls of the opening of a ring-shaped core of a magnetic head, an inside wall of a opening or slot of either one of the left or right component pieces of a magnetic head, or the inside wall(s) of hollow or recess part(s) formed on the magnetic gap plane of a core of a magnetic head. As a result of the measuring of the spattered material by a differential thermal analyzer, the crystallization temperature TX was observed as being 540° C. One or several layers of the spattered layer of ferromagnetic amorphous alloy, each being about 10 μm thick, are formed on the substrate, with thin $SiO_2$ layers each being about 0.1 μm thick as insulation layers in between. Then, on the ferromagnetic amorphous alloy layers formed on the substrate, a non-magnetic sheet, which is of the same or similar material as the substrate, is placed to form a laminated block. A pair of blocks of the half core piece are then bonded by to form a magnetic head. In this process, the temperature of the glass bonding by the low melting point glass is limited as follows:

For example, in case of the above-mentioned $Co_{81}$-$Nb_{15}$-$Zr_4$, the crystallization temperature TX which makes the ferromagnetic amorphous alloy lose performance of a magnetic core by crystallization is 540° C. But in making a head, the temperature of 540° C. is not, of course, inadmissible, and an upper limit of the usable temperature range, is lower than the above-mentioned temperature, though it depends on the processing period, and is between 450° C. and 500° C. Therefore, the useful low melting glass is limited to that having a low melting point in the above temperature range.

The following embodiment uses a glass including lead as one of the components. For example, a glass that has a softening point of 365° C. consists of PbO of 84%, $B_2O_3$ of 10%, $Al_2O_3$ of 3% and $SiO_2$ of 3%. In order to lower the softening point still more, it is necessary to increase the component ratio of PbO. But, as a result, the glass becomes unstable, and the problem of poor strength is induced.

FIG. 1 shows a concrete embodiment. An amorphous ferromagnetic core 13 is formed by spattering on a non-magnetic substrate 11 such as of glass. The core 13 consists of a composite layer consisting of one or several amorphous ferromagnetic films as magnetic material and $SiO_2$ films as insulator films in between which are alternately piled up by alternate spattering. For instance, three films each 10 μm thick are laminated with 0.5 μm $SiO_2$ film in between. On the surface of the core 13 of the composite layer, another sheet of glass 12 is placed, thereby constituting a sandwich structure with the core 13 in the center part. A slot 14 for a coil is bored in the block A. Then, chrome is spattered 1 μm thick inside the coil slot 14 onto an oblique face which contiguous with a gap-forming surface 16, and a chrome layer (metal layer) 15 is thereby formed. The a gap-forming surface 16 which is bonded to a gap-forming surface 16 of the other block of an amorphous ferromagnetic core 13 and a pair of glass substrate 11 and 12 is ground flat in a subsequent process. In this case, amorphous ferromagnetic material of $Co_{81}$-$Nb_{15}$-$Zr_4$ is used as a material of the core 13, and glass ceramics including silica lithium is used as a main component for a pair of glass substrate 11, 12. The crystallization temperature of the above-mentioned amorphous ferromagnetic material was 540° C., but a decrease of saturation flux density is observed for the processes under the temperature of 540° C. And for practical usage, the maximum limit of the temperature and time are 480° C. and 30 minutes, respectively. In the case that a chrome layer 15 is formed by spattering, the temperature rise of the amorphous itself can be suppressed so as to remain under the temperature of 200° C. by sufficiently cooling the substrate.

Figure 2:
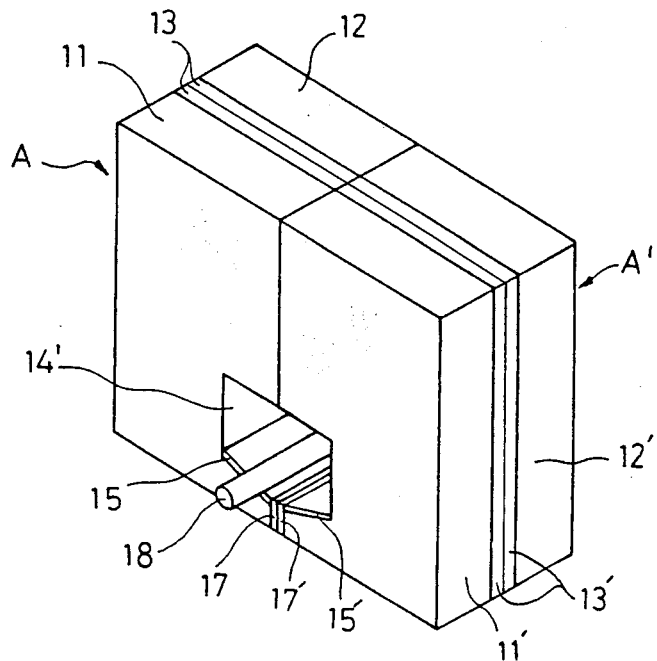
FIG. 2 is a perspective view showing a step of assembling a core of the magnetic head.

As shown in FIG. 2, a gap spacer 17 is formed by spattering of $SiO_2$, and its thickness is 1200 Å for each of the left and right core blocks A, respectively. In the above-mentioned process, the temperature rise of the amorphous material itself is suppressed so as to remain under the temperature of 200° C. by sufficiently cooling the substrate to be spattered. It is to be noted that this gap spacer 17 should not be formed on the chrome layer 15.

In order to form the gap, as shown in FIG. 2, a low melting point lead glass rod 18 (diameter: 0.2 mm) is set in an opening 14' of the magnetic core, and the left and right core blocks A and A' are butted each other and heated at the temperature of 480° C. for 30 minutes. This low melting point lead glass consists of PbO 84%, $B_2O_3$ 10%, $Al_2O_3$ 3%, and $SiO_2$ 3%. Though softening point of this glass is 365° C., a temperature of over 500° C. is needed to obtain a viscosity of $10^2$ poise suitable for working of glass. By the way, in order to drop this softening point, for example, one might think to increase the content of PbO. However, the more the content of PbO increases, the more the softening point drops, and as a result, the glass reaches unstable state, and the state of devitrification or substantial lowering of strength of the glass is observed, and the glass can not stand mechanical working.

Figure 3:
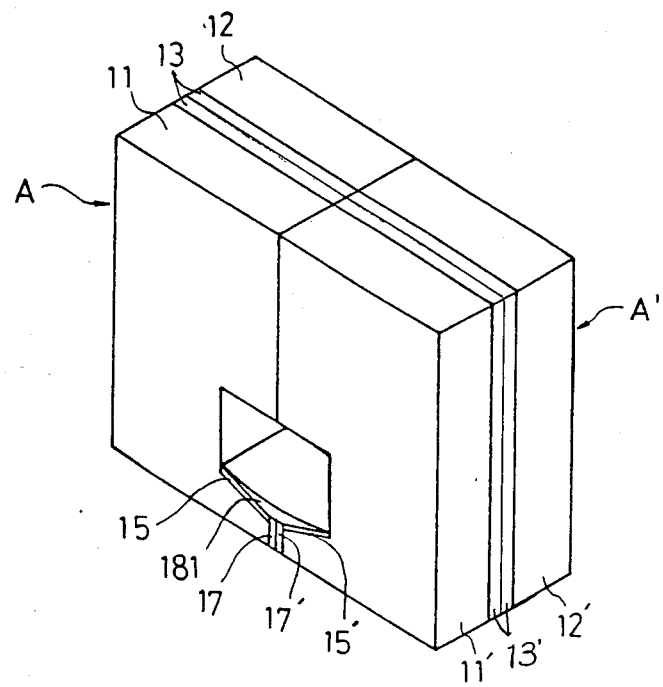
FIG. 3 is a perspective view of the core of the embodiment wherein gap bonding has been completed.

According to the present invention, since the chrome layer 15 is formed in the opening 14' of the magnetic core, the glass has a good wetting property and flows sufficiently on the core blocks A, A', even at the temperature of 480° C., and becomes the bonding layer 181, as shown in FIG. 3, and the glass layer has a sufficient bonding strength which can stand mechanical working. By the way, in the case that the glass bonding was processed at a temperature of 480° C. without forming such chrome layer 15, the core block was not wetted with the glass, and the glass became small round balls by the effect of surface tension and bonding was impossible.

Figure 4:
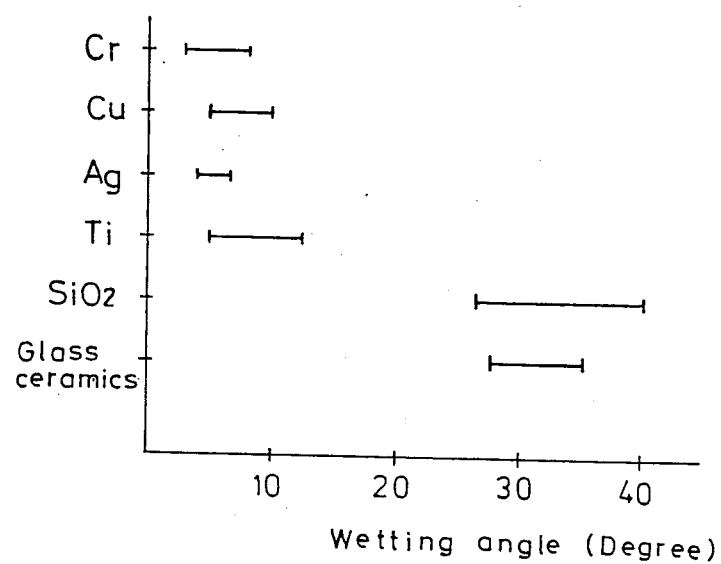
FIG. 4 is a graph showing wetting angles on a lead glass for various kinds of the material.

The wetting property of this low melting point lead glass has been greatly improved because the foundation was a chrome layer. As shown in FIG. 4, by measurements of the wetting angles of the low melting point lead glass against various foundations, it was recognized that the wetting angle became small by using chrome, copper, silver or titanium as the foundation. As above-mentioned, by forming the metal layer 15 on a part, which is inside the core and contiguous to the gap-forming surface 16, and subsequently carrying out the glass bonding at that place, a sufficiently strong and reliable core of magnetic head is obtainable by the bonding method. This method eliminates the conventional defect that the temperature of the glass working was too high since such metal layer was not provided, making actual working of glass bonding impossible.

Figure 5:
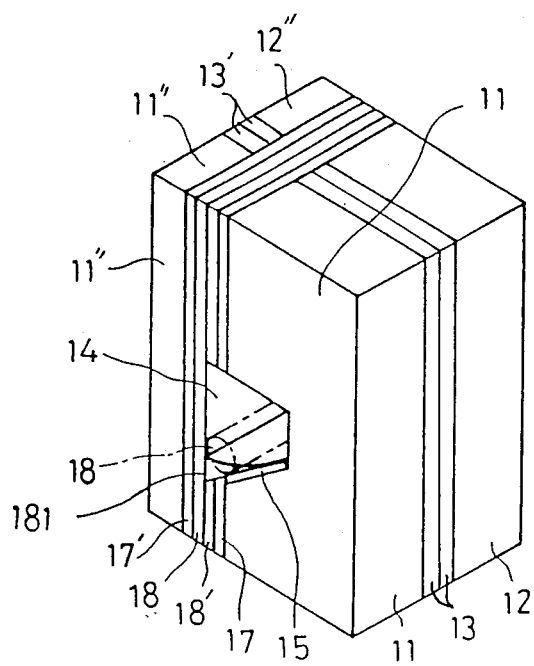
FIG. 5 is a schematic perspective view showing a step of assembling a core of a second embodiment.

FIG. 5 shows the structure of a second embodiment of the magnetic head according to the present invention. A spattered film of $SiO_2$ 17' and a low melting point glass layer 18' on the SiO₂ film 17' for good wetting of glass and also as a part of gap spacer are provided on a linear-shaped core half 11", 12", 13'. An SiO₂ film 17' and a low melting point glass layer 18' is formed on the bonding face only of a U-shaped core half 11, 12, 13, which has a coil winding window 14. A Cr film 15 is formed by spattering on oblique plane only of the coil winding window 14. The core halves 11", 12", 13' and 11, 12, 13 were assembled to each other by butting them at their gap faces similarly as the first embodiment of FIG. 2 and FIG. 3, and heating them also under the same conditions as the first embodiment. As a result, a bonding of good wetting property and great mechanical strength was obtained. This result shows that a metal film is not necessary to be provided on both pieces 11", 12", 13' and 11, 12, 13, of the core. That is, the metal film may be provided on at least either one core, and the glass layer 18' which is the same kind of the bonding glass may be formed on other core, thereby to provide a glass-bonding of good wetting property and of great mechanical strength.

It is understood that in the configuration shown in FIG. 5, the forming of the Cr film even only on the oblique place is also greatly effective. The allignment of the positions of the coil slots of two core pieces is unnecessary, and the butt-bonding of both core halves can be fairly easy in the manufacturing process.

Figure 6:
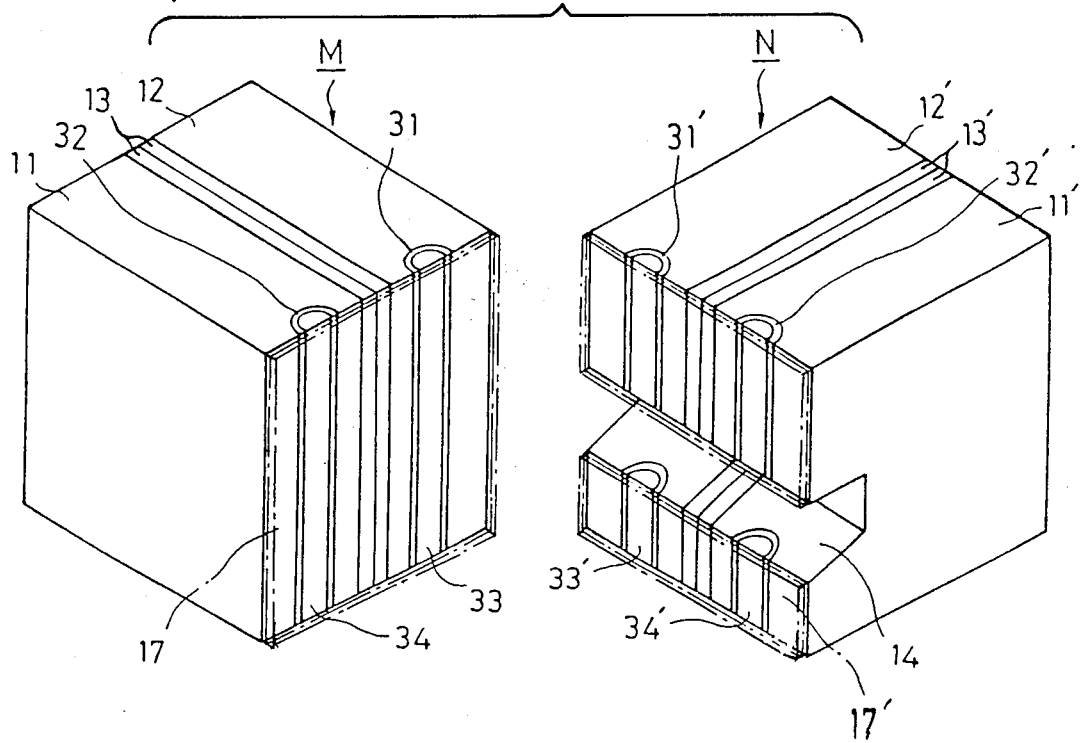
FIG. 6 is a decomposed perspective view of a left half core and a right half core of a third embodiment.

FIG. 6 shows a third embodiment, wherein amorphous ferromagnetic core pieces 13 and 13' are clamped by glass substrates 11 and 12 and also by glass substrates 11' and 12', respectively, and bonded, to form half blocks M and N. Then, on each half blocks M and N, the grooves 33 and 34, and also the grooves 33' and 34' are formed on both sides of the amorphous ferromagnetic core 13, 13' on the face of the magnetic gap 16, respectively. Chrome layers 31 and chrome layers 32, and also 31' and 32' are formed on the inside wall of the grooves. Then, each groove 33, 34, 33' and 34' is filled with the low melting point lead glass, and the gap-forming surface 16 is ground flatly as shown in FIG. 6. Subsequently, the spacers 17, 17' (both 0.1 μm thick) are provided at least on the gap part in the lower part of the structure as shown in FIG. 6, and the left and the right half core pieces are butted together to form a block. Then the block is pressed from both sides and heated. As a result, the half core pieces M and N are bonded with a predetermined gap in between, as shown in FIG. 7.

Figure 8:
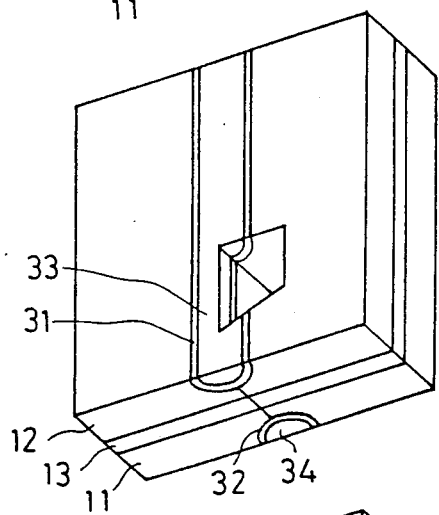
Figure 9:
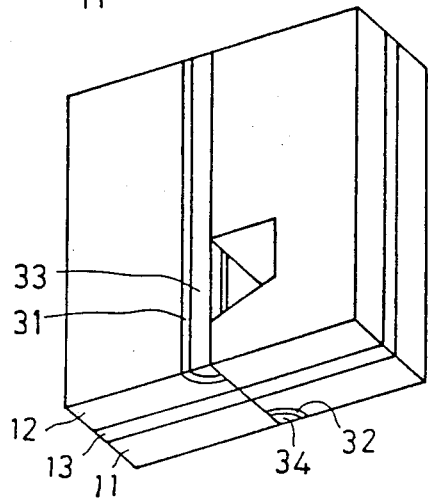

The low melting point glass in the grooves 33, 34, 33' and 34' melts and erodes the spacer glass 17, 17' thereon and bonds the two half core pieces each other. The glass-filled parts of the core thus obtained may be exposed on the outside face as shown in FIG. 8. In such case, the filled parts are preferably arranged substantially in symmetry with respect to a center plane of the core, or in a point of symmetry with respect to the vertical center axis on the gap plane as shown in FIG. 9. In this third embodiment, when the glass is filled in the grooves of the gap faces, by forming the metal layer on the inside wall of the grooves the glass can be filled at a fairly low temperature.

Figure 7:
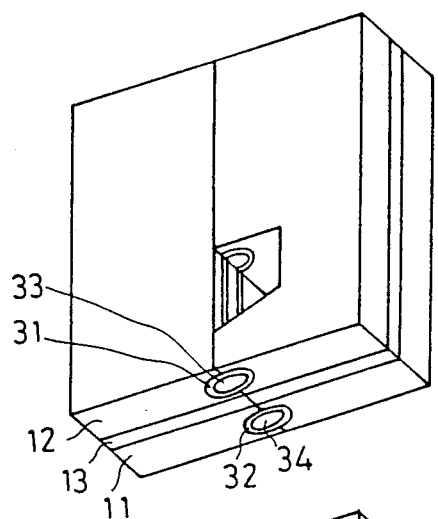
FIG. 7, FIG. 8 and FIG. 9 are perspective views of the various types of magnetic head.

In the cases of the embodiment of FIG. 7 and FIG. 8, since the bonding is processed between the same kind of glass, a reliable bonding is obtained at a lower temperature than the cases of the first and second embodiments.

What is claimed is:
1. A magnetic head, comprising:

two core pieces, each comprising a laminated block having a ferromagnetic core layer sandwiched between a first non-magnetic substrate layer and second non-magnetic substrate layer:
said two core pieces having respective confronting edge surfaces at which corresponding ones of said layers confront one another, block to block;
a corresponding portion of each of said confronting edge surfaces constituting a respective gap-forming surface, a magnetic gap being defined between said gap-forming surfaces;
means defining a recess for a coil winding in at least one of said core pieces, each said recess defining means being contiguous with said gap-forming surface of the respective said core piece;
a gap spacer means provided in said gap on at least one of said gap-forming surfaces;
at least one groove formed in said first non-magnetic substrate layer in the confronting edge surface of a respective said block, at least part of such groove being formed in the corresponding gap-forming surface;
at least another groove formed in said second non-magnetic substrate layer in the confronting edge surface of a respective said block, at least part of such groove being formed in the corresponding gap-forming surface;
each said grooves being defined by a respective inner wall surface;
a metal layer formed on said wall surface of each said grooves;
said core pieces being bonded together by a filling of adherent glass in said grooves, said glass in each said grooves adhering both to a respective said metal layer in such groove in a respective one of said blocks and to bonding means provided on the corresponding non-magnetic substrate layer on the corresponding other of said blocks;
each said ferromagnetic core layers comprising at least one layer of amorphous ferromagnetic material; and
said adherent glass filling said grooves being a lead-containing glass having a melting point which is lower than the temperature of crystallization of said amorphous ferromagnetic material;
said gap spacer means comprising:
two first layers of high melting-point glass, one adhering to each said gap-forming surfaces; and
a second layer of lower melting-point glass sandwiched between said two first layers of high melting-point glass and adhering to both of said two first layers of high melting-point glass.
2. The magnetic head of claim 1, wherein:
said lower melting-point glass has a melting point in the range of 450° C.-500° C.
3. The magnetic head of claim 2, wherein:
said high melting-point glass is SiO₂ and said lower melting-point glass is a lead glass made of not more than 84 percent PbO by weight.
4. The magnetic head of claim 2, wherein:
each said ferromagnetic core layers comprises at least one layer of amorphous ferromagnetic material; and
said adherent glass filling said grooves is a lead-containing glass having a melting point which is lower than the temperature of crystallization of said amorphous ferromagnetic material.

* * * * *